Figure 3:
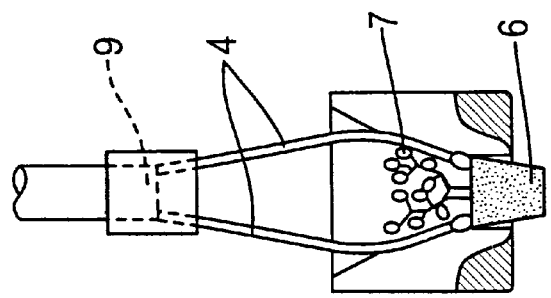

United States Patent [19]

Ferrand

[11] Patent Number: 5,954,002
[45] Date of Patent: Sep. 21, 1999

[54] DEVICE FOR THE FAST PRICKING OUT OF PLANTS

[76] Inventor: Claude Ferrand, 263 Rt. DE Beuet, Nice, France, 06200

[21] Appl. No.: 08/687,348

[22] PCT Filed: Feb. 1, 1995

[86] PCT No.: PCT/FR95/00123

§ 371 Date: Dec. 5, 1996

§ 102(e) Date: Dec. 5, 1996

[87] PCT Pub. No.: WO95/20867

PCT Pub. Date: Aug. 10, 1995

[30] Foreign Application Priority Data

Feb. 2, 1994 [FR] France .................................. 94 01424

[51] Int. Cl.$^6$ .................................................. A01C 11/02
[52] U.S. Cl. ............................ 111/100; 111/103; 111/114
[58] Field of Search ................. 47/1.01, 901, 73, 47/74, 77, 87; 111/100, 101, 103, 104, 105, 114

[56] References Cited

U.S. PATENT DOCUMENTS

| | | | |
|---|---|---|---|
| 3,078,816 | 2/1963 | Poll ........................................ | 111/100 |
| 4,869,637 | 9/1989 | de Groot ............................. | 111/105 X |
| 5,121,955 | 6/1992 | Visser .................................. | 111/104 X |
| 5,160,235 | 11/1992 | Bikow ................................ | 111/105 X |
| 5,241,917 | 9/1993 | Ferrand ................................. | 111/114 |
| 5,557,881 | 9/1996 | Bouldin et al. ..................... | 111/105 X |

Primary Examiner—Michael J. Carone
Assistant Examiner—Robert Pezzuto
Attorney, Agent, or Firm—McDermott, Will & Emery

[57] ABSTRACT

The present invention relates to a device for rapidly pricking out plants. It is comprised of a positioning element comprising an internal vertical passage wherein the plant together with its ball of earth, introduced through the top or through the bottom, may be immobilized momentarily by appropriate device, before it is driven from top to bottom towards the planting area by use of rods penetrating sideways into the positioning device through slots provide to this effect so as to bear directly to the earth ball without touching the foliage. It relates to the industrial field of agriculture machines and is intended to the automatic high speed transfer of earth ball-borne plantlets.

12 Claims, 4 Drawing Sheets

DEVICE FOR THE FAST PRICKING OUT OF PLANTS

The subject of the present invention is a device for quickly pricking out plants.

It relates to the industrial field of agricultural machinery, and is intended for the high-speed automatic transfer of very young plants with root balls.

In the devices for automatic pricking-out which are known to date, the root ball together with the seedling which is to be pricked out is generally introduced from above into a positioning element the purpose of which is either to convey the plant above the place where it is to be planted, or to hold it temporarily in order to allow a conveyor system to convey the planting zone under the seedling which is then ejected from the positioner element by a mechanical, pneumatic or some other means into a cavity or pre-hole prepared beforehand for this purpose.

For example, Patent No. FR 90 05172, by the same inventor, describes such a device which consists of a vertical positioner into which the young plant is introduced simply under gravity, and of a blowing head which fits over the positioning element and allows air or gas to be injected into it when the assembly comes above the pricking-out place. With this system, it sometimes happens that the seedling falls down beside the positioner or topples over, which as often as not means it has to be removed.

This method exhibits the additional drawback of causing a substantial amount of time to be wasted. This is because before it is possible to reach the final phase of pricking-out, it will have been necessary to extract the plant using means which as often as not present risks of mutilating the leafy or root part and to transport it to its final place.

Another patent filed, still by the same applicant, under No. FR 91 13350 describes an opening vertical positioning element formed of two parts separated by an axial vertical seedling which can move away from each other, said positioner being associated, on the one hand, with a vertical push rod which can introduce into it from below the young plant with its root ball when it is open, appropriate automatic means then causing it to close so as to hold onto the seedling and, on the other hand, with a mechanical ejector which drives the plant downward into the planting zone by pressing on the root ball by means of rods the ends of which have a bulbous portion.

In service, this second system has revealed a significant shortcoming. As they move vertically downward, the rods of the ejector before reaching the root ball brush against the leafy part, which is often damaged.

The device according to the present invention, which may be considered as an improvement to Patent No. FR 91 13350, has as its objective to overcome these drawbacks. It actually makes it possible to avoid any waste by eliminating any risk of mutilating the leafy part, while providing a very high rate of pricking out.

It consists of a positioning element including a vertical internal passage in which the seedling with its root ball, introduced from above or from below, can be temporarily immobilized by appropriate means before it is driven out downward toward the planting zone by virtue of rods penetrating the positioner laterally via slots provided for this purpose so that they press directly on the root ball without touching the leafy part of the seedling.

Figure 2:
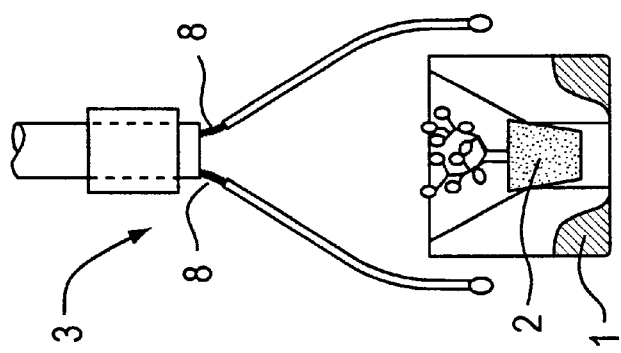
Figure 1:
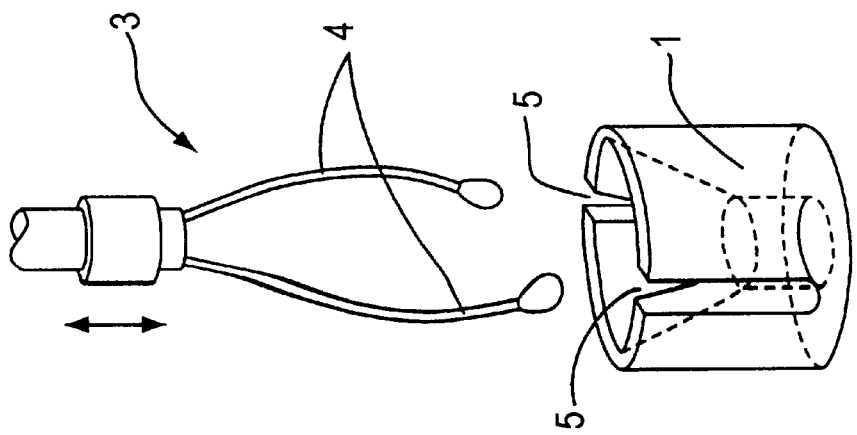
Figure 4:
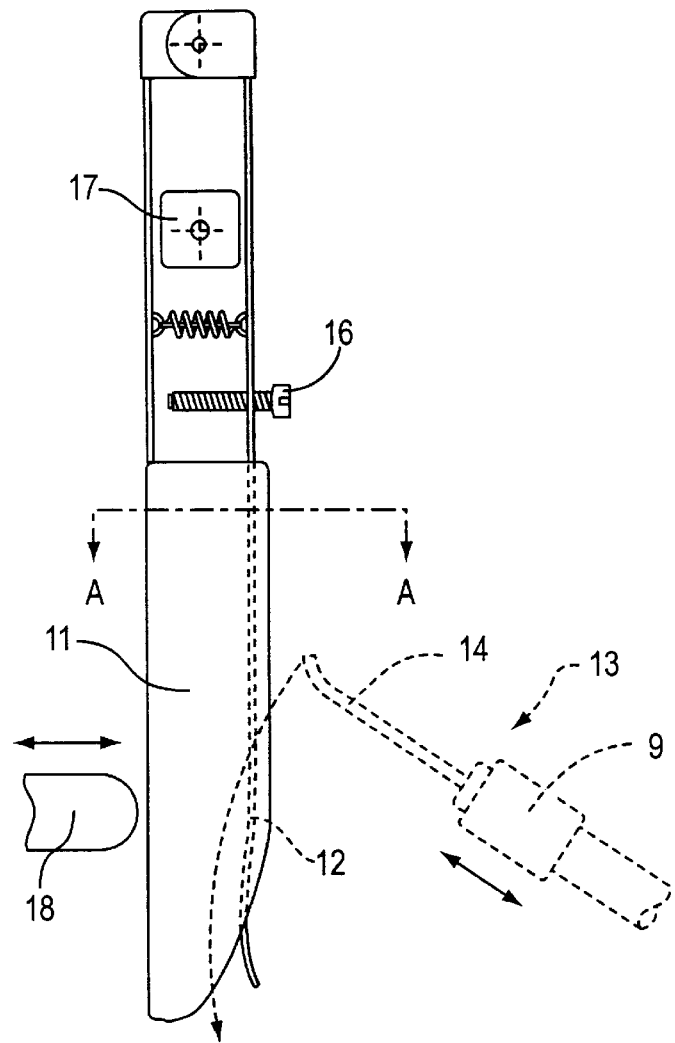
Figure 5:
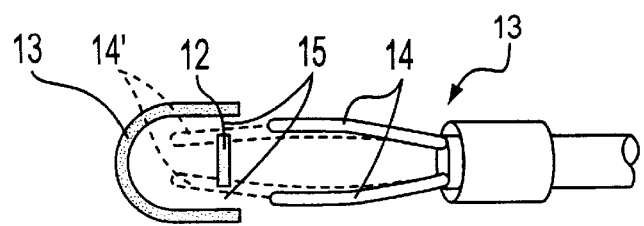
Figure 6:
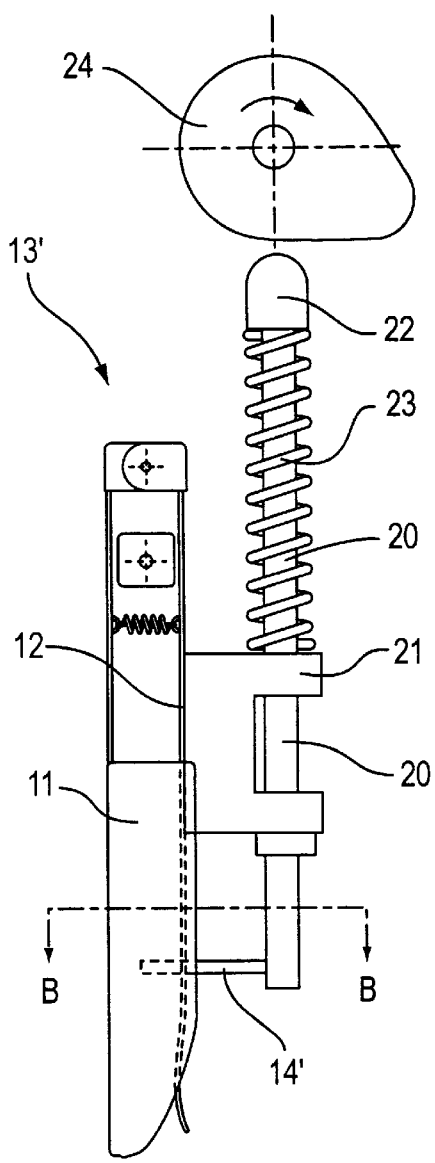
Figure 7:
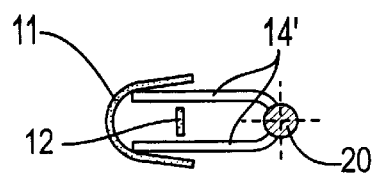

In the attached diagrammatic drawings, given by way of nonlimiting examples of embodiments of the subject-matter of the invention:

FIG. 1 represents, in perspective, a conically tapered positioner associated with an upper ejector with a vertical movement provided with a sliding sleeve intended to bring the rods closer together when their ends are even with the upper part of the root ball, FIGS. 2 and 3 show, in vertical axial section, the same positioner with the rods in the up and in the down position respectively, FIG. 4 represents, in elevation, a cylindrical positioner with a moving element for immobilization, with lateral ejector with pivoting movement, FIG. 5 is a transverse section on arrows A—A of FIG. 4, FIG. 6 represents, in elevation, a positioner with a mobile element for immobilization, with sliding lateral ejector integral with this mobile element, FIG. 7 is a transverse section on arrows B—B of FIG. 6

Figure 8:
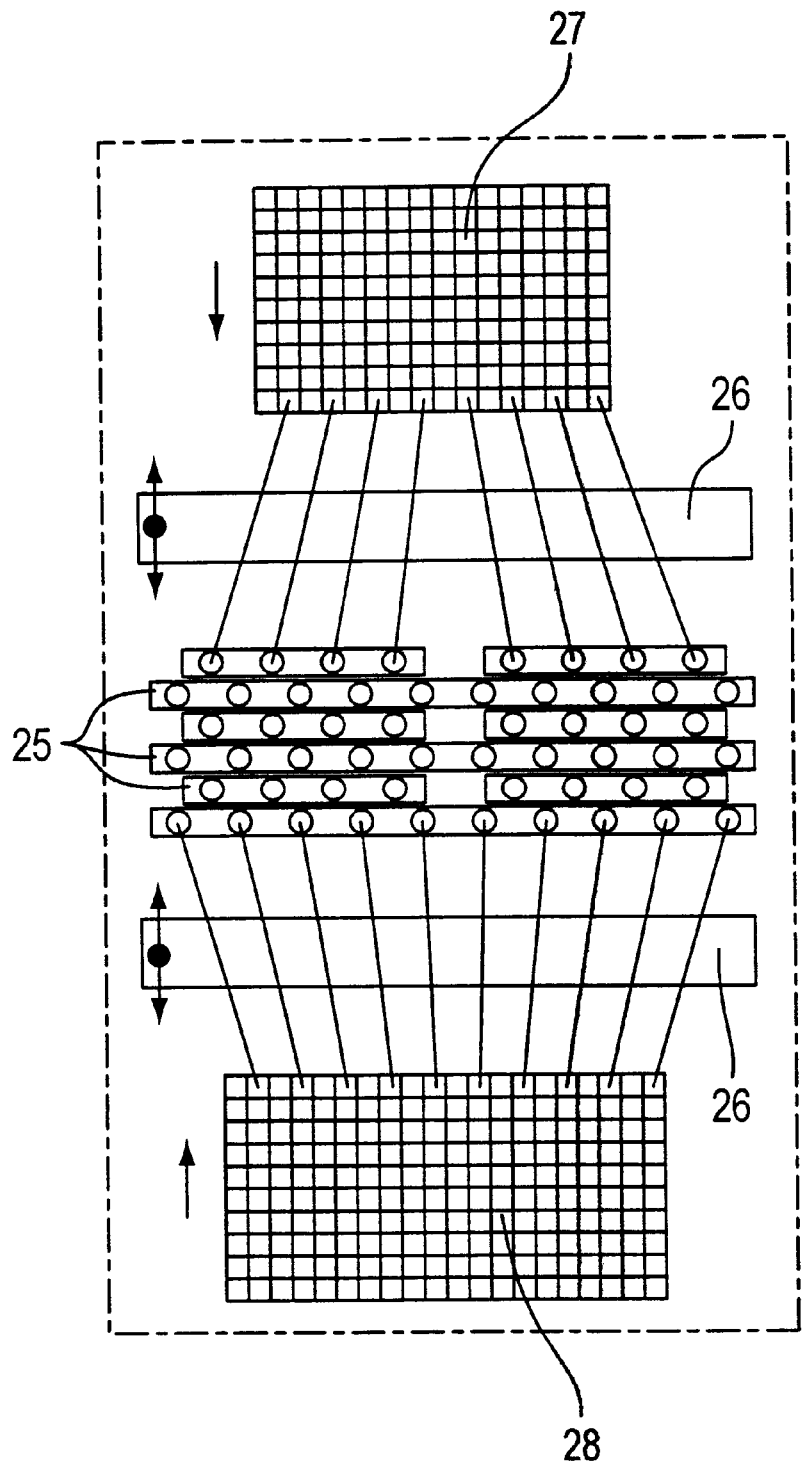

And FIG. 8 shows, viewed from above, the arrangement of multiple positioners in a staggered configuration.

The device, FIGS. 1 to 7, consists of an assembly formed of a positioning element 1, 11 with a vertical internal passage for the seedling 2, and of an upper mechanical ejector 3, or lateral mechanical ejector 13 bearing flexible or rigid rods 4, 14 arranged to penetrate the positioner laterally through slots or openings 5, 15 provided for this purpose and to drive the seedling downward by pressing on the root ball 6 without touching the leafy part 7.

In a first embodiment (FIGS. 1 to 3), the internal passage of the positioner 1 is, in succession, conically tapered at the top and cylindrical at the bottom, the lower cylindrical part having a diameter which is slightly smaller than that of the root ball 6 so that the seedling 2 is held inside the positioner.

Above the latter there is an ejector 3 with a vertical movement extended downward by at least two flexible rods 4 which are curved so that they are distant from the leafy part 7 of the seedling when their ends are resting on the root ball 6.

The rods 4 may also either be formed of flexible wires or strips, which may or may not be made of metal, or be rigid and articulated or fixed to the ejector by a spring 8 or some other elastic element providing them with their flexibility (FIG. 3).

The seedling 2 is introduced either from above or from below the positioner 1. In the second case, said positioner consists of at least two moving parts which can move far enough from each other to allow the passage of the plant with its root ball. When the plant has reached its position, a mechanism causes the moving parts to move closer together so as to hold the seedling inside the positioner, by virtue of its smaller-diameter lower cylindrical part. The positioning element 1 may be opened by the horizontal sliding of the moving parts, or by virtue of an articulation system with twin stays, or by a vertical-axis hinge, or by any appropriate means.

When the seedling 2 is in place in the positioner 1, the ejector 3 is lowered until the ends of the rods 4 are just above the root ball 6. Said rods which, at rest, are separated so as to be distant from the leafy part 7 and make it easier for the seedling 2 to be introduced, are then brought closer together so that they pass through the slots 5, by virtue of the action of a cylindrical sleeve 9 sliding vertically around the upper part of the rods, downward, in order to move the rods tighter together, and upward for releasing them. Finally, the ejector 3 is lowered again in order to drive the seedling out toward the planting zone, forcing it through the cylindrical part of the positioner.

In a second embodiment (FIGS. 4 and 5) the internal passage of the positioner 11 has the shape of a U-shaped channel section closed by an articulated part 12 arranged so that by virtue of a spring it presses on the seedling 2 in order to immobilize it after it has been introduced into the inside of the positioner. An adjustable stop 16 prevents said articulated part from closing up again on the leafy part 7 when the root ball 6 is pushed out of the device, while allowing this device to be used for seedlings of various sizes. A rotary device, such as a cam, a rotary shaft 17 which may be square or have a variable profile, or some equivalent means moves the channel section and the articulated part 12 apart when the plant is introduced.

During the pricking-out phase, the plant is driven toward the planting zone by means of a lateral ejector 13 with a movement which pivots about an axis, and which is extended by two rods 14 arranged to pass through slots 15 formed between the U-shaped part of the positioner 11 and the articulated part 12, during this operation, the channel section is kept in a vertical position by virtue of a retractable stop 18. The position of the axis of the ejector 13 and the length of the rods 14 are determined so that the ends of these rods can press against the root ball 6 without the risk of damaging the leafy part 7.

Just as with the conically tapered positioner 1, said rods may be flexible, initially apart so as to pass on each side of the articulated part 12, penetrating the positioner 11, and brought closer together in the down position (in dotted line, reference 14' in FIG. 5) thus recentering the seedling 2, by virtue of the action of a cylindrical sleeve 9 or similar device sliding axially along the ejector 13.

According to an alternative embodiment (FIGS. 6 and 7), the seedling 2 is driven out toward the planting zone by means of a lateral ejector 13' with a vertical sliding movement integral with the articulated part 12.

The ejector 13' is formed of a vertical rod 20 sliding in a support 21 fixed to the articulated part 12. The vertical rod 20 is terminated at its upper end by a fitting 22 with a rounded head or bearing a roller, and at its lower part bears two rods 14' arranged to pass through the slots 15 formed between the U-shaped part of the positioner 11 and the articulated part 12. A return means 23, such as a spring slipped over the vertical rod between the support 21 and the fitting 22 keeps said rod in the up position at rest. The downward movement of the vertical rod is brought about by a cam 24, a push rod or a lever acting on the fitting 22.

The rods 14' may be flexible, initially apart so as to pass each side of the articulated part 12, penetrating inside the positioner 11, and brought closer together in the down position (in dotted line, reference 14' in FIG. 7) thus recentering the seedling 2, by virtue of a U-shaped part in the form of a cone.

Several positioning elements 1, 11 operating simultaneously may advantageously be arranged in a row.

In particular, it is possible to combine several parallel sets 25 on one and the same supporting structure, the positioning elements of one set being arranged in a staggered configuration with respect to the positioning elements of the contiguous sets. The sets, which operate simultaneously or alternately, deposit the seedlings on successive staggered rows of the same planting zone, but are fed by transfer systems 26 from two loading boxes or trays 27, 28 arranged on each side of the series of sets 25, so as to allow these to operate without moving sideways. The two loading trays 27, 28 each have a different number of cells in the lengthwise direction, and preferably move in opposite directions. This particular feature considerably simplifies the construction and development of high-rate pricking-out machines, while giving them a remarkable reliability.

The positioning of the various constituent elements gives the subject-matter of the invention a maximum useful effect which has not hitherto been obtained with similar devices.

I claim:

1. A device for pricking out a seedling having a root ball and a leafy part, comprising:

a positioning element including a channel section with an articulated part delimiting a passage for the seedling, the channel section having an open side partially closed by the articulated part except for two elongated openings located on both sides of the articulated part, the articulated part being movable away from the channel section to allow an introduction of the seedling, the articulated part pressing the seedling against the channel section to immobilize said seedling; and a mechanical ejector having two movable rods capable of penetrating inside the passage of the positioning element by sliding respectively through the elongated openings to apply a pressure on the root ball without damaging the leafy part and drive the seedling toward a planting zone.

2. The device as claimed in claim 1, wherein the positioning element further comprises:

a spring to hold the articulated part against the seedling; and an adjustable stop to prevent the articulated part from closing onto the leafy part when the root ball is driven out of the positioning element, while allowing the latter to be used for seedlings of various sizes.

3. The device as claimed in claim 2, wherein the positioning element comprises a rotary element with a variable profile to move apart the channel section and the articulated part during the introduction of the seedling.

4. The device as claimed in claim 3, wherein the rotary element is a cam.

5. The device as claimed in claim 3, wherein the rotary element is a rotary shaft with a square cross section.

6. The device as claimed claim 1, further comprising a retractable stop to keep the channel section in a vertical position during a pricking out phase.

7. The device as claimed in claim 6, wherein the positioning element has a U-shaped part delimiting the passage with the articulated part, and wherein the mechanical ejector comprises:

a support fixed to the articulated part; and a vertical shaft capable of being slid in the support, the vertical shaft having an upper end terminated by a fitting with a rounded head; and wherein the device further comprises:

a cam for pushing downwardly the vertical shaft by applying a vertical pressure onto the rounded head, the shaft being returned to an upper position of rest by a resilient means, the shaft having a lower part to bear the two movable rods which are arranged to slide through the elongated openings, and the elongated openings being formed between the U-shaped part and the articulated part.

8. The device as claimed in claim 7, wherein the resilient means is a spring mounted around the vertical shaft between the support and the fitting.

9. The device as claimed in claim 1, wherein the mechanical ejector bearing the two rods is capable of a pivotal movement about an axis, said axis having a position and the rods having a length determined so that ends of these rods apply the pressure on the root ball without damaging the leafy part.

10. The device as claimed in claim 9, wherein the mechanical ejector comprises a cylindrical sleeve capable of being slid axially along the rods, and the rods are flexible, initially apart so as to slide through the elongated openings when the sleeve is not slid along the rods, penetrating inside the passage then brought closer together in a down position when the cylindrical sleeve is slid axially along the rods.

11. Arrangement of devices as claimed in claim 1, 3, 4, 7 or 8, comprising several parallel sets, each including several of the positioning elements, the sets being mounted on a single supporting structure, the positioning elements of each set being arranged, in series, in a staggered configuration with respect to the positioning elements of contiguous sets, the arrangement also comprising two loading trays for feeding the sets, the trays being arranged on each side of the series of sets so as to allow these to operate without moving sideways.

12. Arrangement of devices as claimed in claim 11, wherein the two loading trays each has a different number of cells in a lengthwise direction, and move in opposite directions.

* * * * *

UNITED STATES PATENT AND TRADEMARK OFFICE
CERTIFICATE OF CORRECTION

PATENT NO. : 5,954,002
DATED : September 21, 1999
INVENTOR(S) : Ferrand

It is certified that error appears in the above-identified patent and that said Letters Patent is hereby corrected as shown below:

Title page,
Inventor section, change "Beuet" to -- Bellet --.

References Cited,
Insert -- Foreign Patent Documents 2682553 (91 13350) France 10/22/91 --.

Signed and Sealed this

Twenty-third Day of October, 2001

*Attest:*

Nicholas P. Godici

NICHOLAS P. GODICI
*Attesting Officer*  *Acting Director of the United States Patent and Trademark Office*